R. MACRAE.
ELECTRIC VEHICLE.
APPLICATION FILED SEPT. 5, 1916.
1,332,561.
Patented Mar. 2, 1920.
3 SHEETS—SHEET 1.
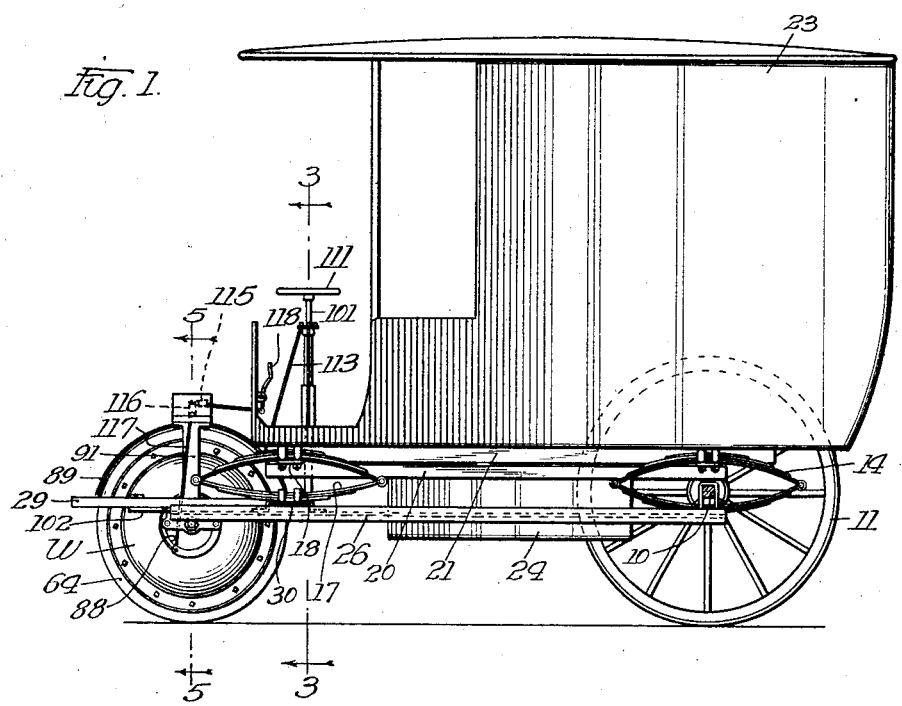
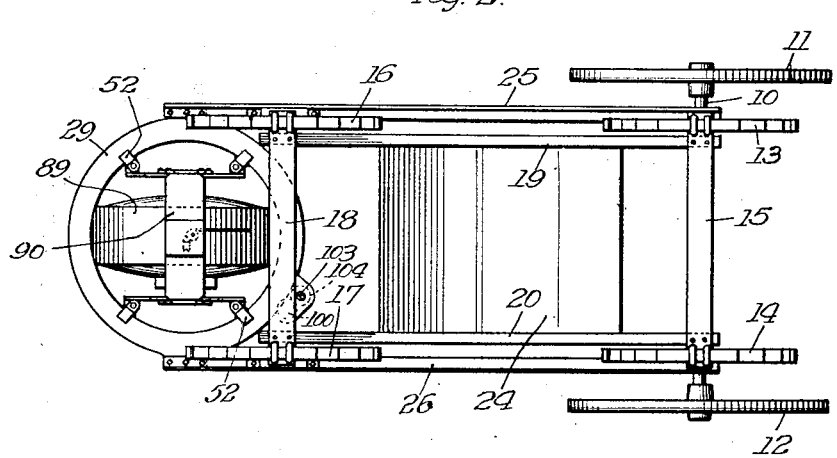

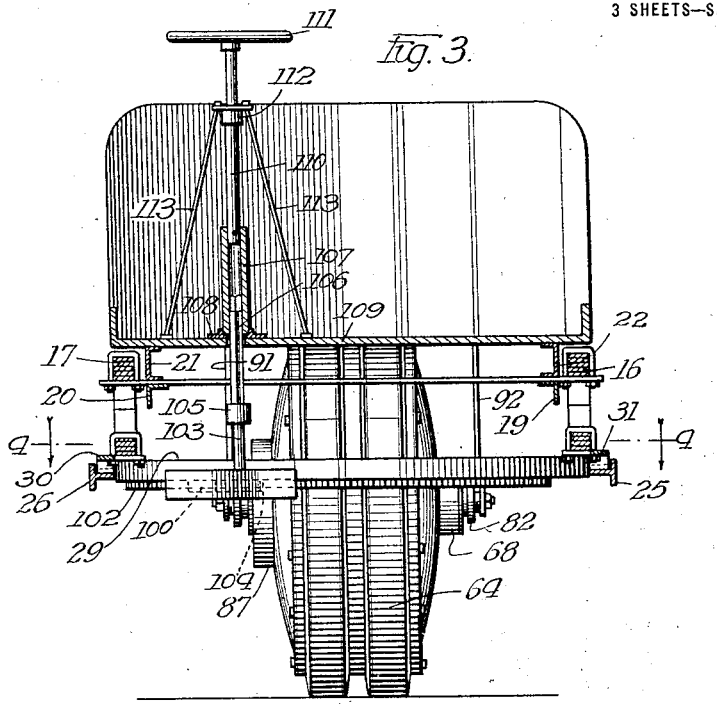
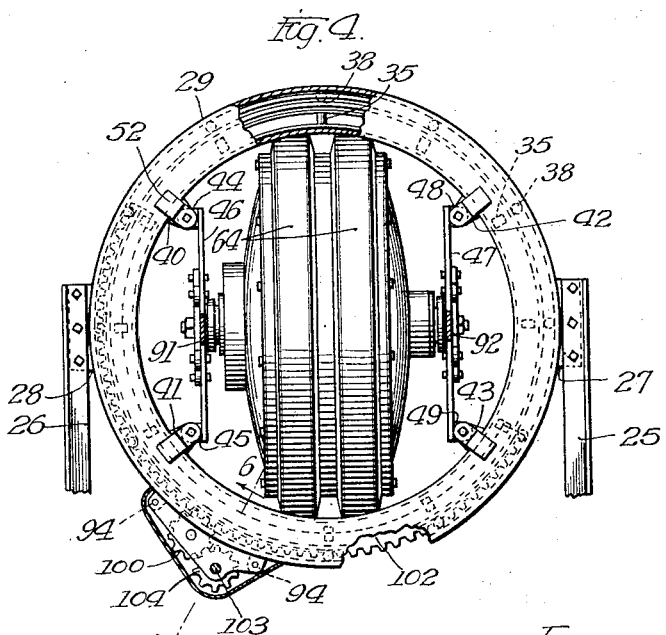

R. MACRAE.
ELECTRIC VEHICLE.
APPLICATION FILED SEPT. 5, 1916.
1,332,561.
Patented Mar. 2, 1920.
3 SHEETS—SHEET 3.
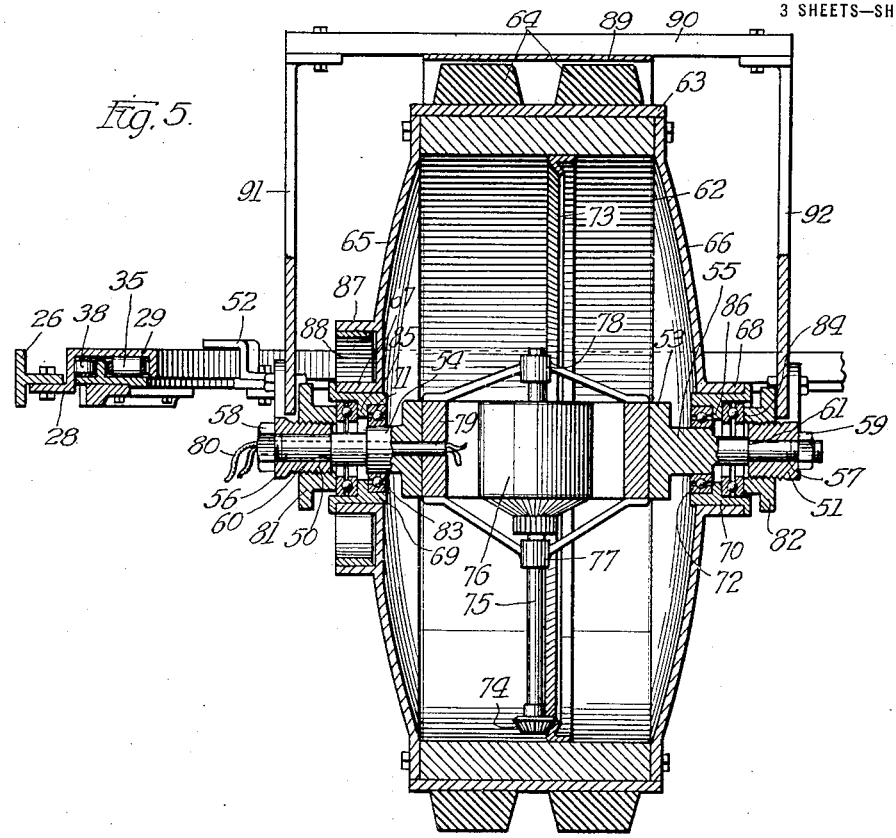
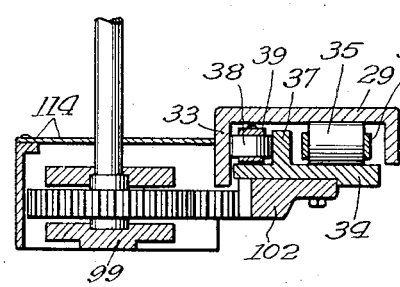
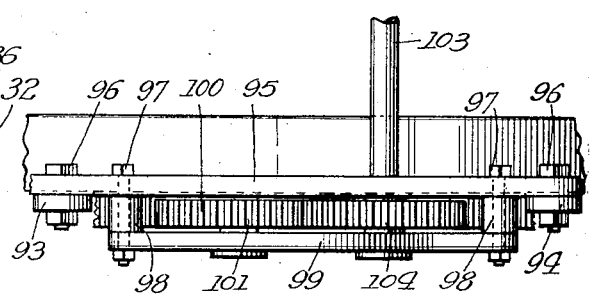

UNITED STATES PATENT OFFICE.

RODERICK MACRAE, OF CHICAGO, ILLINOIS.

ELECTRIC VEHICLE.

1,332,561.   Specification of Letters Patent.   Patented Mar. 2, 1920.

Application filed September 5, 1916. Serial No. 118,443.

*To all whom it may concern:*

Be it known that I, RODERICK MACRAE, a subject of the King of England, and a resident of Chicago, in the county of Cook and State of Illinois, have invented certain new and useful Improvements in Electric Vehicles, of which the following is a specification.

My invention relates to electric vehicles particularly to that class in which an electrically driven wheel is substituted for the front axle and wheels of a vehicle of the ordinary horse-drawn type.

Commercial vehicles of the ordinary horse-drawn type readily adapt themselves for conversion into electrically propelled vehicles, and the general object of my invention is to provide simple, inexpensive and efficient electric driving and steering wheel structure to be substituted for the ordinary front axle and wheels. More in detail, one of the features of the invention resides in a frame which is secured to the running gear of an ordinary vehicle in place of the front axle and wheels and which supports upper and lower relatively rotatable rings of a steering circle. Another feature resides in the improved connection with and adjustment relative to the lower ring of a wheel driven by an internal electric motor, the current supply for which is furnished by a battery suspended on the running gear and controlled by current controlling mechanism readily operable by the driver. A vehicle embodying the various features of my invention is shown on the accompanying drawings in which—

Figure 1 is a side elevational view of a vehicle to which my invention is applied, Fig. 2 is a plan view of the vehicle with the body removed, Fig. 3 is an enlarged sectional view on plane 3—3, Fig. 1, Fig. 4 is a sectional view on plane 4—4, Fig. 3, Fig. 5 is an enlarged sectional view on plane 5—5, Fig. 1, Fig. 6 is an enlarged sectional view on plane 6—6, Fig. 4, Fig. 7 is a view taken from the left of the part shown in Fig. 6.

In the vehicle shown the axle 10 supports the wheels 11 and 12, and the elliptic springs 13 and 14 have their lower sections secured to the axle. The upper sections of the springs are secured to the ends of a transverse beam 15 and the upper sections of the front elliptic springs 16 and 17 are secured by a similar beam 18, and supported by the ends of these beams are the side beams 19 and 20. On these side and transverse beams rest the supporting beams 21 and 22 for the vehicle body 23, and when the vehicle is electrically driven the battery supporting box 24 is supported from the beams 19 and 20 in any suitable manner. Rigidly secured at their rear ends to the ends of the axle 10 are the beams 25 and 26 which are secured at their front ends to the side extensions 27 and 28 on the annular upper frame 29 of steering circle mechanism, the lower sections of the springs 16 and 17 being secured to these side beams as shown at 30 and 31, the side beams being shown as of T cross-section.

The frame or ring 29 is of inverted U cross-section, as clearly shown in Figs. 5 and 6, with its inner and outer flanges 32 and 33 extending vertically downwardly. The lower frame or ring 34 of the steering circle is concentric with the ring 29 and supports the driving and steering wheel structure W. Between the rings vertical bearing rollers 35 are supported on a frame 36, and between the outer flange 33 and the intermediate upstanding flange 37 on the lower ring 34 bearing rollers 38 are pivoted on frame 39, the rollers 35 providing frictionless vertical bearing between the rings and the rollers 35 providing frictionless radial bearing between the rings and keeping them in concentric relationship.

Extending inwardly from the lower ring 34 are the lugs 40, 41 and 42, 43. Secured by horizontal lugs 44 and 45 to the lugs 40 and 41 is a vertical plate 46, and a similar plate 47 is secured by its lugs 48 and 49 to the lugs 42 and 43. These plates are parallel and support at their centers the horizontal inwardly extending sleeves 50 and 51. Secured to the lugs 40, 41, 42 and 43 in common with the plates 46 and 47 are retaining brackets 52 which extend over the upper ring 29 and serve to prevent vertical separation of this ring from the lower ring of the steering circle.

The wheel structure shown is of the well known kind in which the wheel frame is rotated by means of an electric motor within the frame (see for example my Patent No. 1,075,717 dated October 14, 1913). Referring to Fig. 5, the yoke 53 has trunnions 54 and 55 extending therefrom whose reduced ends 56 and 57 pass respectively through the sleeves 50 and 51 which extend inwardly from the plates 46 and 47 secured to the lower steering ring 34. These ends are securely clamped in the sleeves by the nuts 58 and 59 against the shoulders 60 and 61. The yoke 53 is surrounded by the fellies 62 of the wheel which are surrounded by the rim 63 which mounts the rubber tires 64, and side plates 65 and 66 are secured to the sides of the fellies. The side plates at their centers have the hub flanges 67 and 68 in which bushings 69 and 70 support ball bearings 71 and 72 which receive the trunnions 54 and 55 respectively of the yoke frame 53, the wheel being thus journaled for rotation. Within the wheel is secured the annular gear rack 73 with which meshes the driving pinion 74 on the shaft 75 of the armature 76. The shaft is journaled in bearing brackets 77 and 78 extending from the ends of the field frame 79 which is supported within the yoke 53. The trunnion 51 is hollow and extending therethrough are the electrical conductors 80 for connection with the armature and field windings in the well known manner. When current is applied the motor is bodily stationary but its armature revolves and through the engagement of the pinion 74 with the rack 73 the wheel is rotated and the vehicle is propelled. One feature of my invention is the provision of means for axially shifting the wheel to thereby adjust the meshing engagement between the rack 73 and the pinion 74. As shown, the sleeves 50 and 51 are threaded on their exteriors to receive adjusting nuts 81 and 82, the inner ends of these nuts engaging against ball bearings 83 and 84 which are within the bushings 69 and 70 and engage against the intermediate walls 85 and 86 respectively. When the nuts are turned the entire wheel will be shifted along the trunnions 54 and 55 and thus adjustment is made for the meshing engagement between the armature pinion and the rack.

One of the side plates of the wheel may be provided with an annular extension wall 87 concentric with the hub wall 67 to form an annular compartment for brake mechanism 88 of any well known construction. A mud guard 89 may also be provided for the wheel and suspended from the cross plate or board 90 secured to the upper ends of the vertical extensions 91 and 92 on the plates 46 and 47 respectively.

Rotation of the lower ring 34 and swinging of the wheel for steering purposes is accomplished by gearing mechanism. Extending outwardly from the lower edge of the outer flange 33 of the upper ring are lugs 93 and 94 which are bridged on top by a plate 95 secured thereto as by means of bolts 96. By means of bolts 97 and spacers 98 a plate 99 is secured below the plate 95. Between the plates an idler gear pinion 100 is journaled on shaft 101 extending through the plates. The pinion meshes with a segmental gear rack 102 secured to the under side of the lower steering ring 34 concentric with said ring. Journaled at its lower end in the plates 95 and 99 is the steering post section 103 which between the plates supports a gear pinion 104 which meshes with the idler pinion 100. As shown in Figs. 1 and 3, the steering post section 103 is connected by a universal coupling 105 with the polygonal post section 106 which telescopes in the polygonal lower end of the sleeve 107 mounted to rotate in a bearing plate 108 secured to the floor 109 of the vehicle body. Secured at its lower end in the upper end of the sleeve is the post 110 carrying at its upper end the hand wheel 111. A bearing fitting 112 surrounds the shaft 110 and is supported from the vehicle body floor by braces 113. When the hand wheel is turned the gear pinions will be correspondingly turned and the rack 102 and the lower steering ring 34 will be turned around the vertical axis of the ring which results in swing of the wheel to steer the vehicle. The idler 101 is interposed between the rack and the steering post in order that the ring 34 will turn in the same direction as the steering hand wheel. To protect the pinions against dirt a suitable housing 114 may be provided therefor. The coupling 105 and the telescopic engagement between the shaft 106 and sleeve 107 permits relative movement between the steering ring structure and the vehicle body incident during travel of the vehicle. The rack 102 may be of any extent. As shown, it extends 180 degrees which will permit a 90 degree turn of the wheel in either direction. The rack could, of course, extend the entire distance around so that the wheel could be given a complete turn.

Any suitable arrangement may be provided for operating the brake mechanism 88 from the driver's seat. As shown in Fig. 1, a box 115 is mounted on the cross board 90 and contains suitable pulleys 116 around which a cable 117 extends from the brake mechanism to one end of the foot brake lever 118 pivoted on the vehicle body.

I thus produce simple, inexpensive and efficient steering and power propelling mechanism which can be readily applied to an ordinary vehicle, the conversion from the ordinary vehicle to the power driven vehicle involving merely the application thereto of my improved mechanism in place of the ordinary front wheels and axle, and the mounting of batteries on the running gear and installation of circuit controlling mechanism and steering post mechanism at the driver's seat.

I do not, of course, desire to be limited to the exact construction and arrangement shown and described as modifications may be made which would still come within the scope of the invention. I claim as follows:

1. In a vehicle of the class described, the combination of a supporting frame, a rear axle secured thereto and supporting vehicle wheels, an upper steering ring secured to the front end of said frame, a lower steering ring concentric with said upper ring and having bearing engagement therewith, a front axle secured to and extending diametrally with reference to said lower ring, a wheel within the rings journaled on said front axle, a motor mounted on said front axle within the wheel and having a drive pinion, a gear rack within the wheel meshing with said pinion, means for axially shifting said wheel on said front axle to adjust the meshing connection between said pinion and rack, a source of current for driving said motor, and means for rotating said lower ring to swing said wheel for steering purposes.

2. In a vehicle of the class described, the combination of a supporting frame, a rear axle secured thereto and supporting vehicle wheels, an upper steering ring secured to the front end of said frame, a lower steering ring concentric with said upper ring and having vertical bearing engagement therewith, opposed horizontally extending parallel plates secured to the lower ring, lugs extending diametrally inwardly from the opposed plates, a front axle structure secured in said lugs, a wheel within said rings journaled to said axle structure between the plates, a driving motor mounted on said front axle structure within the wheel and having driving connection with the wheel, said lugs being threaded, nuts having threaded engagement with said lugs to engage with the sides of said wheel to effect bodily axial shift thereof on the front axle structure whereby to adjust the driving connection between the motor and wheel, and means for rotating said lower ring to effect swing of the wheel for steering purposes.

3. In a vehicle of the class described, the combination of a supporting frame, a rear axle on said frame supporting vehicle wheels, an upper steering ring secured to the front end of said frame, a lower steering ring concentric with said upper ring and having vertical bearing engagement therewith, opposed horizontally extending parallel plates secured to the lower ring, lugs extending diametrally inwardly from said plates, a front axle structure secured to said lugs, a wheel within said rings journaled on said axle structure between said plates, an electric motor mounted on said front axle structure within the wheel and having a drive pinion, a gear rack within the wheel meshing with said pinion, said lugs being externally threaded, nuts on said lugs for engaging against the sides of said wheel to effect axial shift of said wheel on said axle structure whereby to adjust the gearing connection between said pinion and rack, an external gear rack secured to the lower steering ring, a vehicle body on said frame and a source of current for the motor, steering post mechanism on said body, and gearing connecting said steering post mechanism with said rack on the lower ring.

4. In a vehicle of the class described, the combination of the vehicle body, a ring journaled on said body and arranged in a horizontal plane, an axle supported in and by said ring, a motor on said axle, a wheel journaled on said axle and surrounding said motor, driving connections between said motor and wheel, means for axially shifting said wheel on the axle to adjust the driving connection, and means for rotating said ring to swing said wheel for steering purposes.

In witness whereof I hereunto subscribe my name this 28th day of August, A. D. 1916.

RODERICK MACRAE.